US011474935B2

(12) United States Patent
Kalyanaraman et al.

(10) Patent No.: US 11,474,935 B2
(45) Date of Patent: Oct. 18, 2022

(54) METHOD AND SYSTEM FOR PROVIDING AUTOMATED TESTING FRAMEWORK FOR SERVICE

(71) Applicant: JPMorgan Chase Bank, N.A., New York, NY (US)

(72) Inventors: Shankaranarayanan Kalyanaraman, Plano, TX (US); Anupam Arora, Middletown, DE (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 301 days.

(21) Appl. No.: 16/387,904

(22) Filed: Apr. 18, 2019

(65) Prior Publication Data

US 2020/0334134 A1 Oct. 22, 2020

(51) Int. Cl.
*G06F 11/36* (2006.01)
*G06F 9/54* (2006.01)

(52) U.S. Cl.
CPC .......... *G06F 11/3692* (2013.01); *G06F 9/547* (2013.01); *G06F 11/3684* (2013.01); *G06F 11/3688* (2013.01)

(58) Field of Classification Search
CPC ............. G06F 11/3684; G06F 11/3688; G06F 11/3692; G06F 9/547
See application file for complete search history.

(56) References Cited

U.S. PATENT DOCUMENTS

| | | | | |
|---|---|---|---|---|
| 8,086,665 B1* | 12/2011 | Soukup | ............ | G06F 9/541 709/203 |
| 8,595,408 B2* | 11/2013 | Uddenberg | ......... | G06F 13/4291 710/316 |
| 8,904,358 B1* | 12/2014 | Peri-Glass | .......... | G06F 11/3608 717/126 |
| 8,954,931 B2* | 2/2015 | Wefers | ............... | G06F 11/3684 717/124 |
| 9,734,298 B2* | 8/2017 | Hall | ........................ | G06F 19/00 |
| 10,230,571 B2* | 3/2019 | Rangasamy | ........ | H04L 41/0803 |
| 10,437,712 B1* | 10/2019 | Tyler | ................... | G06F 11/3684 |
| 10,521,284 B2* | 12/2019 | McClory | ........... | G06F 9/45558 |
| 10,530,849 B2* | 1/2020 | Isci | ........................ | G06F 21/46 |
| 10,594,580 B2* | 3/2020 | Ilyadis | .................... | H04L 43/08 |
| 10,628,243 B1* | 4/2020 | Cramer | .................. | G06F 9/547 |
| 10,740,215 B2* | 8/2020 | Lowe | ................... | G06F 11/3616 |
| 10,762,262 B1* | 9/2020 | Moon | ..................... | G06F 30/33 |
| 10,877,875 B2* | 12/2020 | Knaack | ............... | G06F 11/3692 |
| 2004/0045013 A1* | 3/2004 | Lam | ........................ | G06F 8/36 719/328 |
| 2008/0189094 A1* | 8/2008 | Adir | ..................... | G06F 11/3676 703/14 |
| 2009/0254312 A1* | 10/2009 | Kube | .................... | G06F 11/273 702/186 |
| 2010/0043048 A1* | 2/2010 | Dolby | .................... | G06F 21/53 726/1 |

(Continued)

*Primary Examiner* — Matthew M Kim
*Assistant Examiner* — Matthew N Putaraksa
(74) *Attorney, Agent, or Firm* — Greenblum & Bernstein, P.L.C.

(57) ABSTRACT

Systems and methods are provided for performing a test that relates to a service associated with an application programming interface. Based on a specification for the service, testing scenarios are generated, and then tests are executed. An output report that indicates a health of the service is then generated.

20 Claims, 11 Drawing Sheets

(56) References Cited

U.S. PATENT DOCUMENTS

| | | | | |
|---|---|---|---|---|
| 2012/0233612 | A1* | 9/2012 | Beckett | G06F 9/45516 |
| | | | | 718/1 |
| 2016/0077897 | A1* | 3/2016 | Tsang | G06F 9/547 |
| | | | | 719/328 |
| 2016/0140023 | A1* | 5/2016 | Michelsen | G06F 3/04842 |
| | | | | 717/125 |
| 2017/0295469 | A1* | 10/2017 | Moon | H04W 4/029 |
| 2018/0089005 | A1* | 3/2018 | Green | G06F 9/547 |
| 2018/0324204 | A1* | 11/2018 | McClory | G06F 8/30 |
| 2018/0357154 | A1* | 12/2018 | Dolby | G06F 11/3684 |
| 2019/0114251 | A1* | 4/2019 | Sapozhnikov | G06N 3/0445 |
| 2019/0188121 | A1* | 6/2019 | Simon | G06F 11/3684 |
| 2019/0243753 | A1* | 8/2019 | Zhang | G06F 11/3664 |
| 2020/0117522 | A1* | 4/2020 | Xiao | G06F 9/547 |
| 2020/0133744 | A1* | 4/2020 | MacLeod | G06K 9/6885 |
| 2020/0218588 | A1* | 7/2020 | Sarid | G06F 9/451 |
| 2020/0233787 | A1* | 7/2020 | Battaglia | H04L 63/1433 |
| 2020/0233790 | A1* | 7/2020 | Battaglia | G06F 11/3672 |
| 2020/0250074 | A1* | 8/2020 | Zhang | G06F 11/3688 |
| 2020/0364044 | A1* | 11/2020 | Bahrami | G06F 8/73 |
| 2021/0303454 | A1* | 9/2021 | Wang | G06F 9/54 |
| 2021/0373984 | A1* | 12/2021 | Lu | G06F 9/547 |

\* cited by examiner

500

```
119    responses:
120      '200':
121        description: Successful response from API
122        schema:
123          type: array
124          items:
125            $ref: '#/definitions/AllPhonesResponse'
126      '201':
127        description: >-
128          The request has been fulfilled and resulted in a new resource being
129          created.
130        schema:
131          $ref: '#/definitions/APIErrorResponse'
132      '202':
133        description: >-
134          The request has been accepted for processing, but the processing has
135          not been completed.
136        schema:
137          $ref: '#/definitions/APIErrorResponse'
138      '204':
139        description: No Content
140        schema:
141          $ref: '#/definitions/APIErrorResponse'
142      '400':
143        description: >-
144          Request is invalid - either required data is missing or data is not
145          consistent
146        schema:
147          $ref: '#/definitions/APIErrorResponse'
148      '401':
149        description: >-
150          Authorization Failure. Customer Token does not match. Customer will
151          need to re-do the OAuth
152        schema:
153          $ref: '#/definitions/APIErrorResponse'
154      '403':
155        description: Accessing the resource you were trying to reach is forbidden
156        schema:
```

| Review Comments | Component Name |
|---|---|
| Description is not sufficient | Authorization2 |
| Following Error codes are missing 501 | /v1/phones |
| Following Error codes are optional** 201,202,204,403,404,405,409,422,503 | /v1/phones |
| Description is not sufficient | Authorization2 |
| Following Error codes are missing 501 | /v1/phones/primary |
| Following Error codes are optional** 201,202,204,403,404,405,409,422,503 | /v1/phones/primary |
| Following Error codes are missing 400,401,500,501 | /v1/phones/ping |
| Example is missing | code |
| Description is not sufficient | message |
| Example is missing | message |
| Description is not sufficient | requestURI |
| Example is missing | requestURI |
| Description missing for | errors |
| Example is missing | errors |
| Example is missing | enterprisePartyIdentifier |
| Example is missing | areaCode |
| Example is missing | contactPhoneTypeCode |

```
 1  {
 2    "-ve Test Case Testing Get Back Good response: 200": {
 3       "host": "https://api-qa02.jpmchase.net",
 4       "resource": "/servicing/customer/v1/phones/primary",
 5       "Authorization": "Basic U1BJREVZOnFQNWFN%%5SOGxYNmZXN2hBM3VFNGxJ%",
 6       "Authorization2": "Bearer eyJ0eXAiOiJKV1QiLCJhbGciOiJSUzI1NiIsIngJ
 7       "environment-db": "DB009",
 8       "client-sealId": 46522,
 9       "Request-Timestamp": "2019-01-17T07:56:51.697Z",
10       "Trace-Id": 23453452,
11       "Request-Id": 254324,
12       "accept": "application/json",
13       "Content-Type": "application/json",
14       "Path-Params": {"eci":"000000449934"}
15    },
16    "-ve Test Case Invalid ADFS token: 401": {
17       "host": "https://api-qa02.jpmchase.net",
18       "resource": "/servicing/customer/v1/phones/primary",
19       "Authorization": "Basic U1BJREVZOnFQNWFN%%5SOGxYNmZXN2hBM3VFNGxJ%",
20       "Authorization2": "Bearer XXX",
21       "environment-db": "DB009",
22       "client-sealId": 46522,
23       "Request-Timestamp": "2019-01-17T07:56:51.697Z",
24       "Trace-Id": 23453452,
25       "Request-Id": 254324,
26       "accept": "application/json",
27       "Content-Type": "application/json",
28       "Path-Params": {"eci":"000000449934"}
29    },
```

```
15  DESCRIBE ("CUSTOMER-INFORMATION-SYSTEM-PHONE-API TEST CASES", FUNCTION( ){
16    IT ( '+VE TESTING GET BACK GOOD RESPONSE: /JPMC/CUSTOMER/PROFILE/V1/PHONES/PRIMARY', FUNCTION(DONE){
17      //THIS.TIMEOUT(10000);
18      CHAI.REQUEST('HTTPS://API-QA01.JPMCHASE.NET')
19      .GET('/JPMC/CUSTOMER/PROFILE/V1/PHONES/PRIMARY')
20      .SET( 'AUTHORIZATION', 'BASIC '+BASICTOKEN)
21      .SET( 'AUTHORIZATION2', 'BEARER '+ADFSTOKEN)
22      .SET( 'ENVIRONMENT-DB', 'DB009')
23      .SET( 'CLIENT-SEALID', '123547')
24      .SET( 'TRACE-ID', '14322')
25      .SET( 'REQUEST-ID', '12324')
26      .SET( 'ACCEPT', 'APPLICATION/JSON')
27      .SET( 'CONTENT-TYPE', 'APPLICATION/JSON')
28      .SET( 'PATH-PARAMS', '{"ECI":"0000002964"}')
29      .END( FUNCTION(ERR, RES){
30        CONSOLE.ERROR("RES 3 "+JSON.STRINGIFY(RES));
31        EXPECT (RES) .TO.HAVE.STATUS (200);
32        DONE ( );
33      });
34    });
35
36    IT ( '-VE TESTING CASE INVALID ADFS TOKEN: 401 : /JPMC/CUSTOMER/PROFILE/V1/PHONES/PRIMARY', FUNCTION(DONE){
37      //THIS.TIMEOUT(10000);
38      CHAI.REQUEST('HTTPS://API-QA01.JPMCHASE.NET')
39      .GET('/JPMC/CUSTOMER/PROFILE/V1/PHONES/PRIMARY')
40      .SET( 'AUTHORIZATION', 'BASIC '+BASICTOKEN)
41      .SET( 'AUTHORIZATION2', 'BEARER '+ADFSTOKEN+ "QW")
42      .SET( 'ENVIRONMENT-DB', 'DB009')
43      .SET( 'CLIENT-SEALID', '123547')
44      .SET( 'TRACE-ID', '14322')
45      .SET( 'REQUEST-ID', '12324')
46      .SET( 'ACCEPT', 'APPLICATION/JSON')
47      .SET( 'CONTENT-TYPE', 'APPLICATION/JSON')
48      .SET( 'PATH-PARAMS', '{"ECI":"0000002964"}')
49      .END( FUNCTION(ERR, RES){
50        CONSOLE.ERROR("RES 3 "+JSON.STRINGIFY(RES));
51        EXPECT (RES) .TO.HAVE.STATUS (401);
```

CUSTOMER-INFORMATION-SYSTEM-PHONE-API-TEST-REPORT

CUSTOMER-INFORMATION-SYSTEM-PHONE-API TEST CASES
\TEST\TESTCASES.JS
⏱0MS ■11 ✓9 ✕2

- ⊗ +VE TESTING GET BACK GOOD RESPONSE: /JPMC/CUSTOMER/PROFILE/V1/PHONES/PRIMARY
  ASSERTIONERROR: EXPECTED{OBJECT(DOMAIN_EVENTS,...)} TO HAVE STATUS CODE 200 BUT GOT 401
- ⊘ -VE TEST CASE INVALID ADFS TOKEN: 401 : /JPMC/CUSTOMER/PROFILE/V1/PHONES/PRIMARY
- ⊘ -VE TEST CASE MISSING VALUE FOR ADFS TOKEN: 401 : /JPMC/CUSTOMER/PROFILE/V1/PHONES/PRIMARY
- ⊘ -VE TEST CASE MISSING AUTHORIZATION2 HEADER: 401 : /JPMC/CUSTOMER/PROFILE/V1/PHONES/PRIMARY
- ⊘ -VE TEST CASE INVALID ENVIRONMENT-DB: 500" : /JPMC/CUSTOMER/PROFILE/V1/PHONES/PRIMARY
- ⊘ -VE TEST CASE MISSING TRACE-ID HEADER: 400" : /JPMC/CUSTOMER/PROFILE/V1/PHONES/PRIMARY
- ⊗ -VE TEST CASE MISSING REQUEST-ID HEADER: 400 : /JPMC/CUSTOMER/PROFILE/V1/PHONES/PRIMARY
  ASSERTIONERROR: EXPECTED{OBJECT(DOMAIN_EVENTS,...)} TO HAVE STATUS CODE 400 BUT GOT 401
- ⊘ -VE TEST CASE MISSING VALUE FOR OAUTH TOKEN: 401 : /JPMC/CUSTOMER/PROFILE/V1/PHONES/PRIMARY
- ⊘ -VE TEST CASE MISSING AUTHORIZATION HEADER: 400 : /JPMC/CUSTOMER/PROFILE/V1/PHONES/PRIMARY
- ⊘ -VE TEST CASE INVALID OAUTH TOKEN: 401" : /JPMC/CUSTOMER/PROFILE/V1/PHONES/PRIMARY
- ⊘ -VE TEST CASE INVALID [JUNK] ENV-DB 500 : /JPMC/CUSTOMER/PROFILE/V1/PHONES/PRIMARY

TO FIG. 9A CONT. →

```
 1 {
 2   areaCode:75088,
 3   contactInstructionsText:9254888888,
 4   contactPhoneTypeCode:925,
 5   effectiveDate:02071900,
 6   enterprisePartyIdentifier:02071900,
 7   expirationDate:11111,
 8   extensionNumber:13456667845,
 9   localNumber:13456667845,
10   primaryIndicator:Y,
11   referenceNumber:Checking the Text,
12
13 }
```

METHOD AND SYSTEM FOR PROVIDING AUTOMATED TESTING FRAMEWORK FOR SERVICE

BACKGROUND

1. Field of the Disclosure

This technology generally relates to methods and systems for performing a test that relates to a service, and more particularly, to methods and systems for providing an automated testing framework with respect to an application programming interface (API) that relates to a service.

2. Background Information

Many organizations promote interactions between entities over computer networks. In this aspect, a service may be implemented by creating an application programming interface (API) that enables a user to access the service.

A developer of an API is typically required to ensure that the API conforms with industry standards and internal governance standards. The process of ensuring such conformance may be time-consuming, especially insofar as it is performed on an individualized case-by-case basis. Therefore, there is a need for a tool that performs a generalized testing and validation function for APIs, in order to increase organizational efficiency and reduce labor-intensive costs associated with such testing.

SUMMARY

The present disclosure, through one or more of its various aspects, embodiments, and/or specific features or sub-components, provides, inter alia, various systems, servers, devices, methods, media, programs, and platforms for performing a test that relates to a service associated with an application programming interface (API). The various aspects, embodiments, features, and/or sub-components provide optimized processes of generating test scenarios and executing tests based on a specification for the service.

According to an aspect of the present disclosure, a method for performing a test that relates to a service is provided. The method is implemented by a processor on a computing device. The method includes: receiving, by the processor, a specification for the service, the specification including a plurality of elements; generating, by the processor, a specification review report that relates to whether each element of the specification is compliant with an applicable standard; generating, by the processor, at least one testing scenario for the specification; executing, by the processor, a test for each of the at least one testing scenario; and generating, by the processor, based on a result of the executing, an output report that relates to a health of the service.

The service may be associated with an application programming interface (API).

The plurality of elements may include at least one from among a base path to be used by the service, a resource definition, a service end point, an API description element, a required parameter for a request of the service, a response type, and a response description element.

The generation of the specification review report may include determining whether the API conforms with a predetermined set of governance standards, and generating the specification review report based on a result of the determining.

The specification may be a YAML Ain't Markup Language (YAML) specification.

The at least one testing scenario may include at least one executable open-source JavaScript framework testing scenario.

The method may further include: receiving, by the processor from a user, a user-generated testing scenario; executing, by the processor, an additional test for the user-generated testing scenario; and generating, by the processor, an additional output report based on a result of the executing of the additional test.

The specification may conform with a standard that corresponds to an OpenAPI Specification.

The output report may include at least one error indication that is associated with the service.

The output report may include at least one missing item that is associated with the service.

According to another aspect of the present disclosure, a computing device configured to implement an execution of a method for performing a test that relates to a service is provided. The computing device includes a display screen, a processor, a memory, and a communication interface coupled to each of the processor, the memory, and the display screen. When the method is being executed, the processor is configured to: receive, via the communication interface, a specification for the service, the specification including a plurality of elements; generate a specification review report that relates to whether each element of the specification is compliant with an applicable standard; generate at least one testing scenario for the specification; execute a test for each of the at least one testing scenario; and generate, based on a result of the executing, an output report that relates to a health of the service.

The service may be associated with an application programming interface (API) that is implemented on the display screen.

The plurality of elements may include at least one from among a base path to be used by the service, a resource definition, a service end point, an API description element, a required parameter for a request of the service, a response type, and a response description element.

The processor may be further configured to generate the specification review report by: determining whether the API conforms with a predetermined set of governance standards; and generating the specification review report based on a result of the determining.

The specification may be a YAML Ain't Markup Language (YAML) specification.

The at least one testing scenario may include at least one executable open-source JavaScript framework testing scenario.

The processor may be further configured to: receive, from a user via the communication interface, a user-generated testing scenario; execute an additional test for the user-generated testing scenario; and generate an additional output report based on a result of the executing of the additional test.

The specification may conform with a standard that corresponds to an OpenAPI Specification.

The output report may include at least one error indication that is associated with the service.

The output report may include at least one missing item that is associated with the service.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 5 illustrates a first exemplary screen shot of a display of a YAML file specification, according to an exemplary embodiment.

FIG. 6 illustrates a second exemplary screen shot of a display of a YAML review report, according to an exemplary embodiment.

FIG. 7 illustrates a third exemplary screen shot of a display of a configuration file for generating testing scenarios, according to an exemplary embodiment.

FIG. 8 illustrates a fourth exemplary screen shot of a display of an executable test case, according to an exemplary embodiment.

FIGS. 9A and 9B illustrates a fifth exemplary screen shot and a sixth exemplary screen shot of a display of an output report that is generated based on a result of executing a test case, according to an exemplary embodiment.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
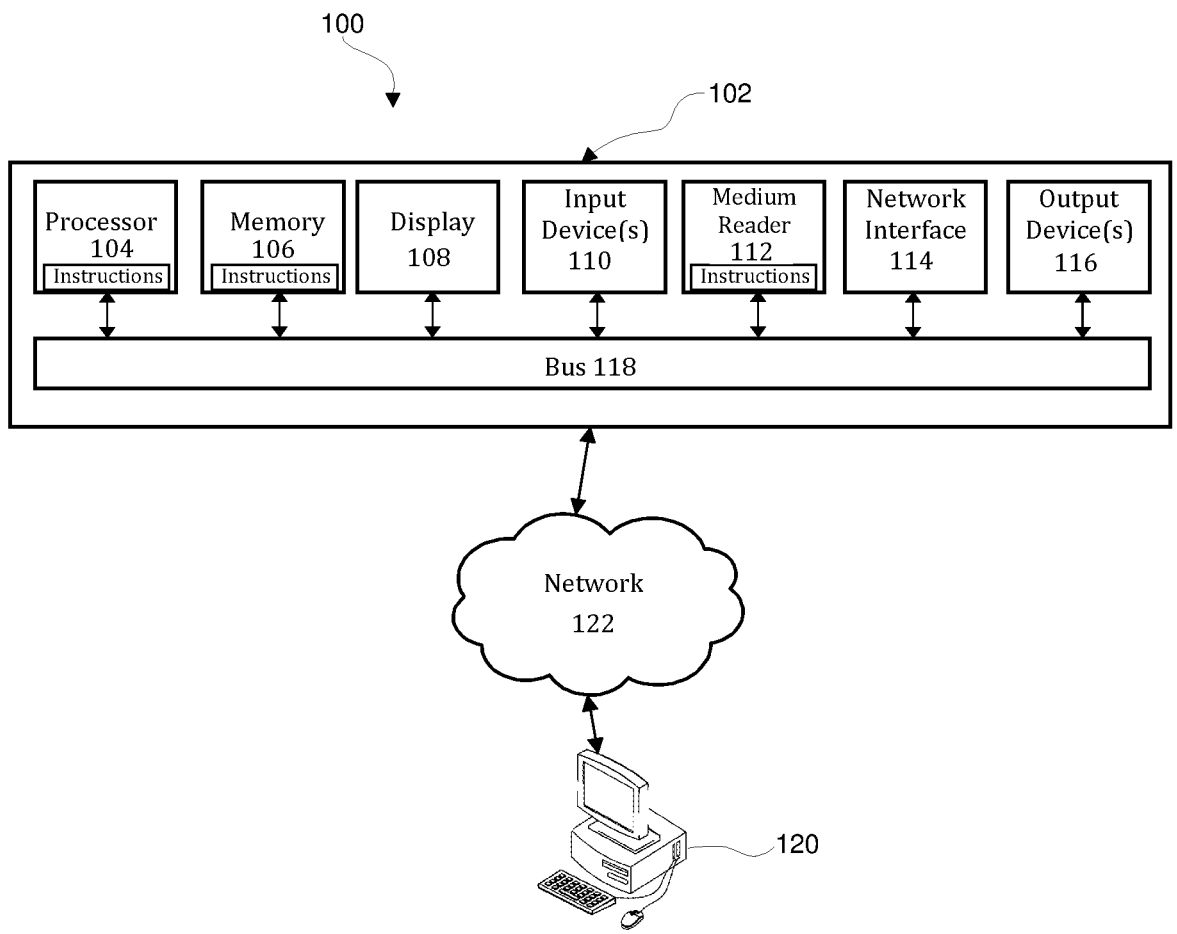
FIG. 1 illustrates an exemplary computer system for implementing a testing framework that relates to a service associated with an API.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

As described herein, various embodiments provide optimized processes of implementing a testing framework that relates to a service associated with an application programming interface (API).

Figure 2:
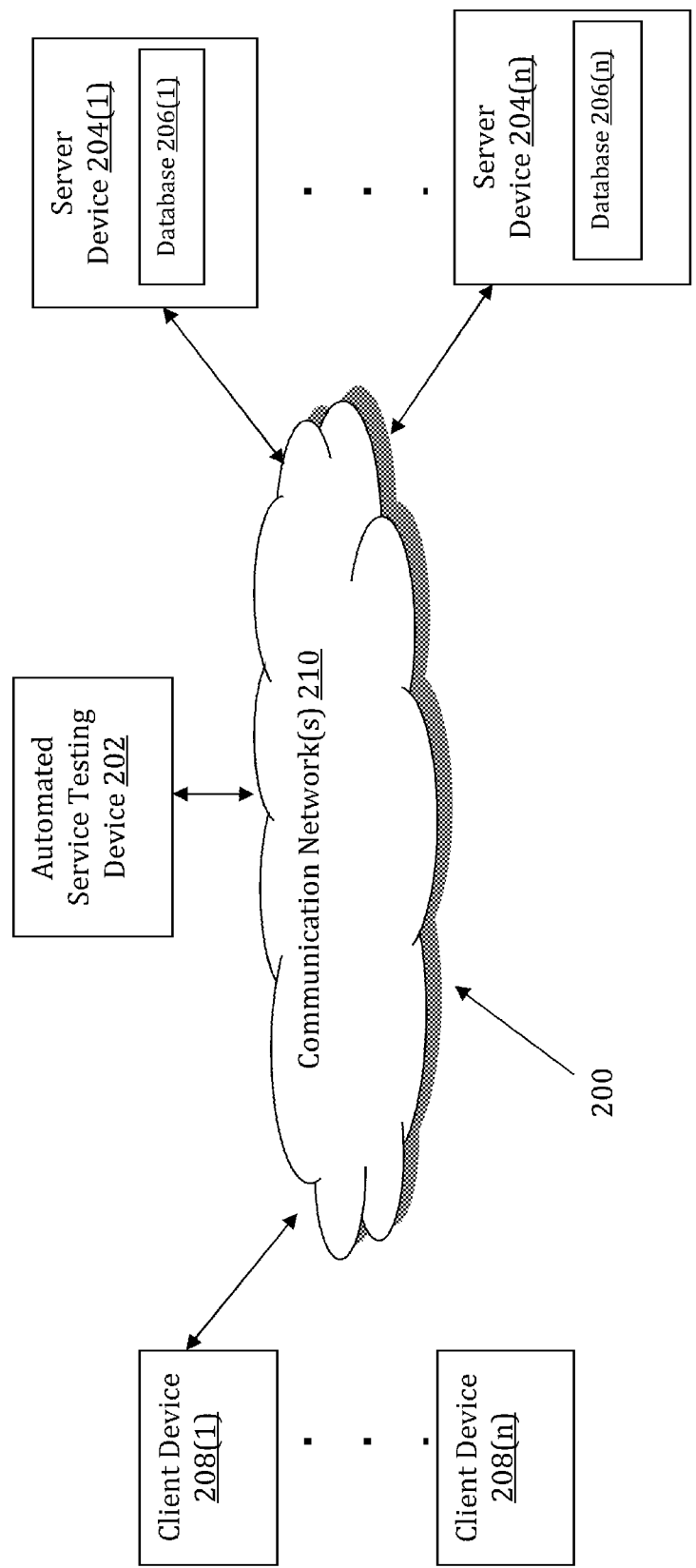
FIG. 2 illustrates an exemplary diagram of a network environment.

Referring to FIG. 2, a schematic of an exemplary network environment 200 for implementing a testing framework that relates to a service associated with an API is illustrated. In an exemplary embodiment, the testing framework is executable on any networked computer platform, such as, for example, a wireless mobile communication device, i.e., a smart phone.

The testing framework that relates to a service associated with an API may be implemented by an Automated Service Testing (AST) device 202. The AST device 202 may be the same or similar to the computer system 102 as described with respect to FIG. 1. The AST device 202 may store one or more applications that can include executable instructions that, when executed by the AST device 202, cause the AST device 202 to perform actions, such as to transmit, receive, or otherwise process network messages, for example, and to perform other actions described and illustrated below with reference to the figures. The application(s) may be implemented as modules or components of other applications.

Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the AST device 202 itself, may be located in virtual server(s) running in a cloud-based computing environment rather than being tied to one or more specific physical network computing devices. Also, the application(s) may be running in one or more virtual machines (VMs) executing on the AST device 202. Additionally, in one or more embodiments of this technology, virtual machine(s) running on the AST device 202 may be managed or supervised by a hypervisor.

In the network environment 200 of FIG. 2, the AST device 202 is coupled to a plurality of server devices 204(1)-204(n) that hosts a plurality of databases 206(1)-206(n), and also to a plurality of client devices 208(1)-208(n) via communication network(s) 210. A communication interface of the AST device 202, such as the network interface 114 of the computer system 102 of FIG. 1, operatively couples and communicates between the AST device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the AST device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and AST devices that efficiently automatically enable and disable a purchase card for attempted transactions.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The AST device 202 may be a standalone device or integrated with one or more other devices or apparatuses, such as one or more of the server devices 204(1)-204(n), for example. In one particular example, the AST device 202 may include or be hosted by one of the server devices 204(1)-204(n), and other arrangements are also possible. Moreover, one or more of the devices of the AST device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the AST device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store configuration file data, industry standards data, internal governance standards data, and data that relates to the testing framework.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can facilitate the execution of a web application or a test that relates to an API. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the AST device 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the AST device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the AST device 202, the server devices 204(1)-204(n), or the client devices 208(1)-208(n), for example, may be configured to operate as virtual instances on the same physical machine. In other words, one or more of the AST device 202, the server devices 204(1)-204(n), or the client devices 208(1)-208(n) may operate on the same physical device rather than as separate devices communicating through communication network(s) 210. Additionally, there may be more or fewer AST devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
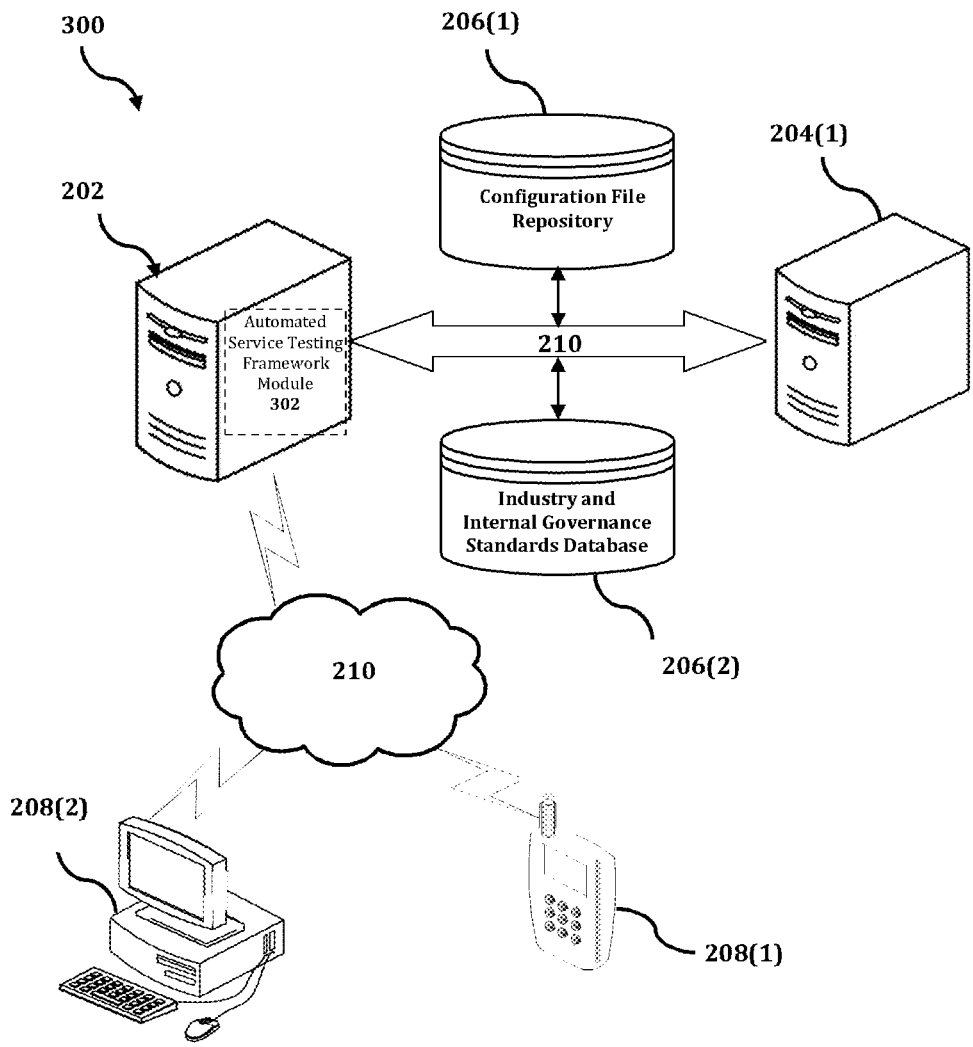
FIG. 3 shows an exemplary system for implementing a testing framework that relates to a service associated with an API.

The AST device 202 is described and shown in FIG. 3 as including an automated service testing framework module 302, although it may include other rules, policies, modules, databases, or applications, for example. As will be described below, the automated service testing framework module 302 is configured to generate test scenarios and execute tests for assessing a health of a service in an automated, efficient, scalable, and reliable manner. Based on information obtained from a configuration file, the automated service testing framework module 302 determines whether an API associated with the service conforms with all relevant industry standards and internal governance standards and provides all expected outputs of the service in an error-free manner.

An exemplary process 300 for implementing a testing framework for a service by utilizing the network environment of FIG. 2 is shown as being executed in FIG. 3. Specifically, a first client device 208(1) and a second client device 208(2) are illustrated as being in communication with AST device 202. In this regard, the first client device 208(1) and the second client device 208(2) may be "clients" of the AST device 202 and are described herein as such. Nevertheless, it is to be known and understood that the first client device 208(1) and/or the second client device 208(2) need not necessarily be "clients" of the AST device 202, or any entity described in association therewith herein. Any additional or alternative relationship may exist between either or both of the first client device 208(1) and the second client device 208(2) and the AST device 202, or no relationship may exist.

Further, AST device 202 is illustrated as being able to access a configuration file repository 206(1) and an industry and internal governance standards database 206(2). The automated service testing framework module 302 may be configured to access these databases for implementing a testing framework for a service.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the AST device 202 via broadband or cellular communication. Of course, these embodiments are merely exemplary and are not limiting or exhaustive.

Upon being started, the automated service testing framework module 302 executes a process for automatically generating test scenarios and executing tests for assessing a health of the service. An exemplary process for implementing a testing framework for a service is generally indicated at flowchart 400 in FIG. 4.

Figure 4:
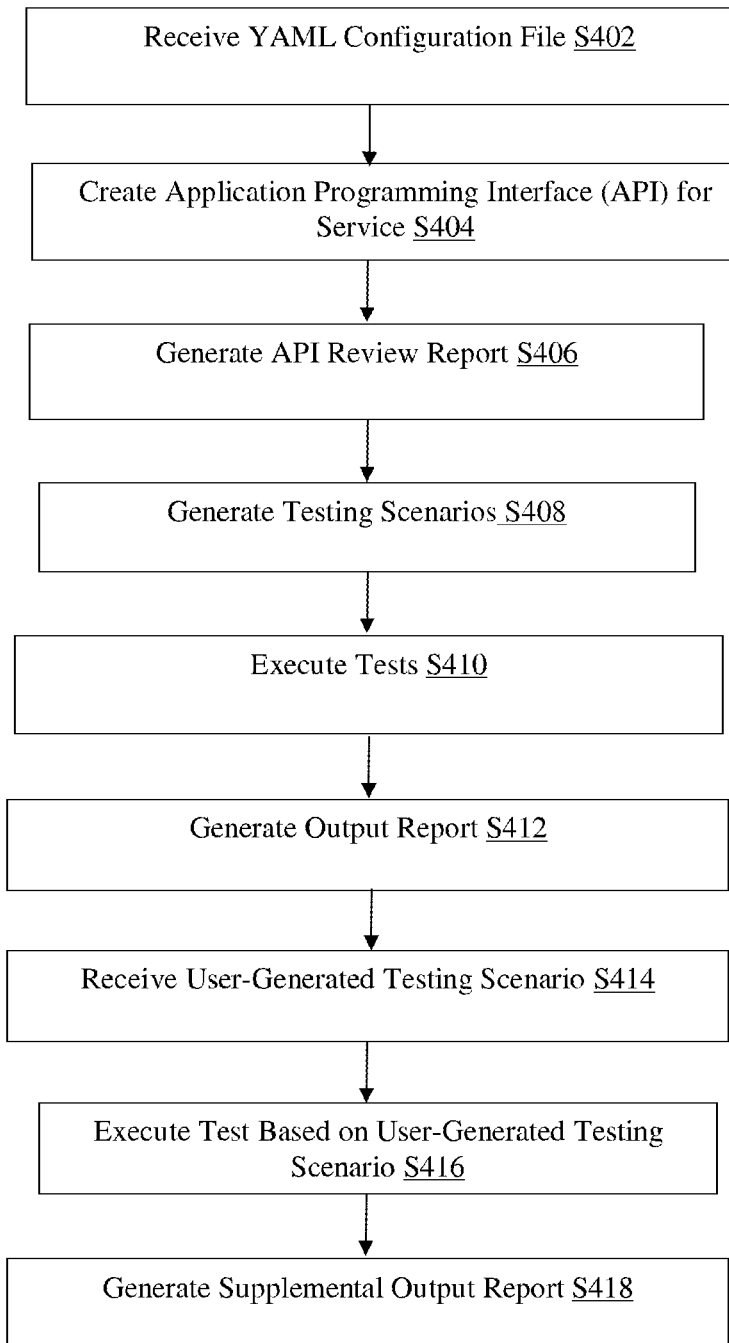
FIG. 4 is a flowchart of an exemplary process for implementing a testing framework that relates to a service associated with an API.

In the process 400 of FIG. 4, while executing the web application, at step S402, a configuration file for a service is received. The service may include, for example, any of a RESTful service (i.e., a web service that is based on the Representational State Transfer ("REST") architectural style), a microservice, or an application configuration, and may perform a function such as, for example, providing telephone number information that is associated with a customer identifier. In an exemplary embodiment, the configuration file is a YAML Ain't Markup Language (YAML) configuration file that provides a specification for the service, and the specification conforms with an OpenAPI specification standard. The service is associated with an application programming interface (API), which enables a user to access the service via a client device 208. The configuration file generally includes several elements, which may include any or all of the following: base path information that indicates a base path to be used by the service; a resource definition; a service end point; an API description element; required parameters for service requests; response types; and a response description element. A screenshot 500 that shows the contents of an exemplary configuration file that provides a YAML file specification is illustrated in FIG. 5.

At step S404, the automated service testing framework module 302 creates an API for the service that is associated with the configuration file. Then, in step S406, an API review report is generated by testing whether each element of the newly created API conforms with all applicable industry standards and all required internal governance standards. The review report provides a list of items for which errors have occurred and/or for which a required item is missing. A screenshot 600 that shows the contents of an exemplary API review report for an API that corresponds to a YAML file specification is illustrated in FIG. 6.

At step S408, the automated service testing framework module 302 generates testing scenarios based on the YAML file specification. In an exemplary embodiment, a testing scenario is an executable open-source JavaScript framework testing scenario that is defined by a JavaScript Object Notation (JSON) configuration file, which is usable for creating executable test cases. A screenshot 700 that shows the contents of an exemplary JSON configuration file that defines testing scenarios is illustrated in FIG. 7. A screenshot 800 that shows exemplary test cases, including dummy data, is illustrated in FIG. 8.

Figure 9A:
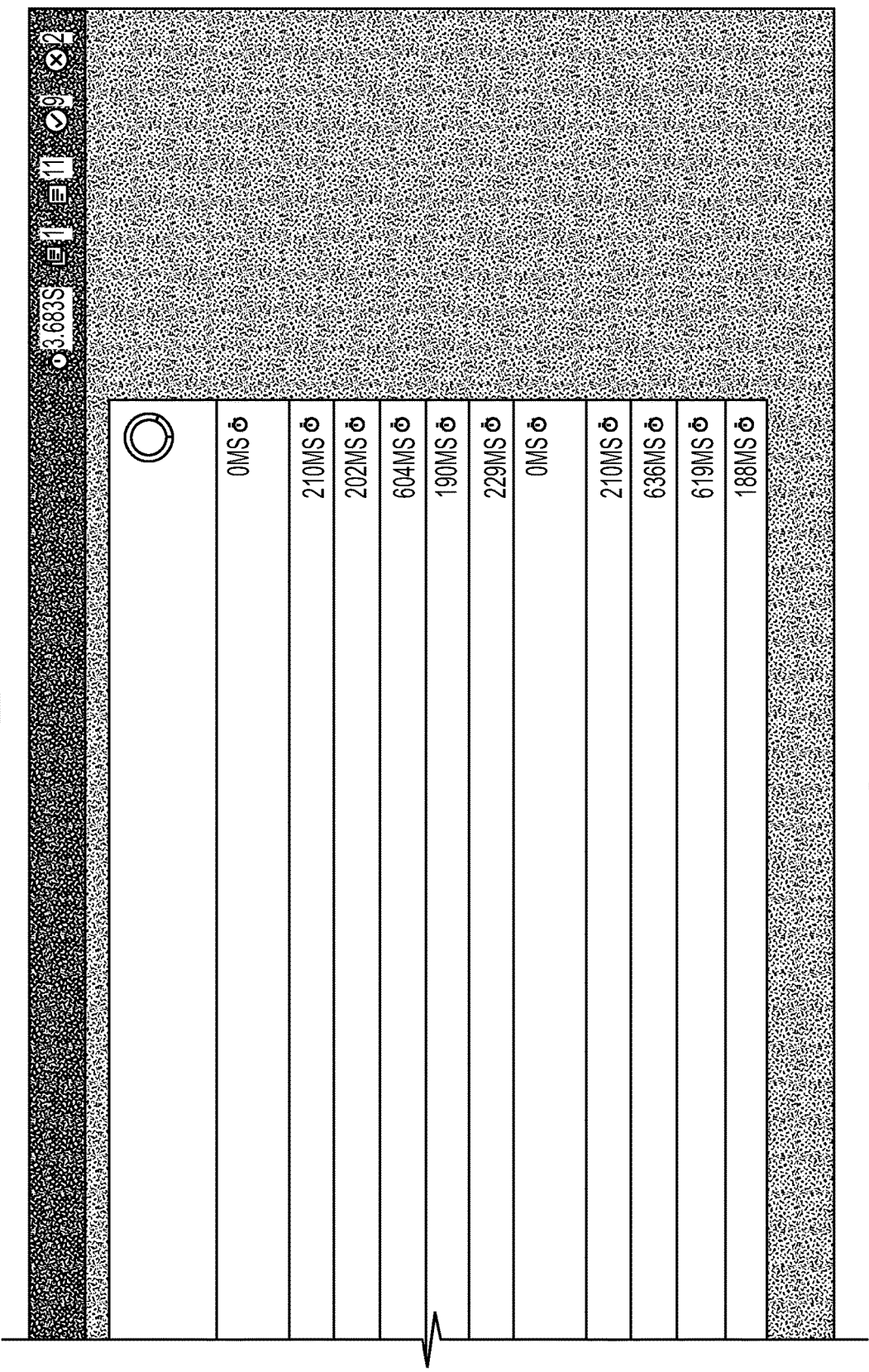

At step S410, the test cases are executed by the automated service testing framework module 302. Then, at step S412, a test case execution report is generated as a result of the execution of the test cases. In an exemplary embodiment, the test case execution report includes error indications that are associated with the service, indications of missing items that are expected results of the service, and indications of successful items that are expected results of the service. A screenshot 900 that shows an exemplary output report is illustrated in FIG. 9A. A screenshot 950 that shows an exemplary substitute service output that is populated with dummy values that may be used for further service testing is also illustrated in FIG. 9B.

At step S414, a user-generated testing scenario is received. Step S414 is optional, and in this aspect, the automated service testing framework module 302 is configured to automatically generate testing scenarios, as in step S408, and also to receive user-generated testing scenarios, thereby affording additional flexibility and system robustness. Then, at step S416, the automated service testing framework module 302 executes a test that is based on the user-generated testing scenario, and a supplemental output report is generated based on the result of the executed test at step S418.

Accordingly, with this technology, an optimized process for implementing a testing framework that relates to a service associated with an API is provided. The optimized process enables a user to efficiently and automatically generate test scenarios and execute tests for assessing a health of the service by determining whether an API conforms with all relevant standards and provides all expected outputs of the service without errors.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for performing a test that relates to a service, the method being implemented by a processor on a computing device, the method comprising:
   receiving, by the processor, a specification for the service, the specification including a plurality of elements;
   automatically generating, by the processor, an application programming interface (API) for the service based on the specification,
      wherein the automatically generated API enables access to the service;
   generating, by the processor, a specification review report that relates to whether each element of the generated API is compliant with an applicable standard, the specification review report including a list of error elements that relates to an identified error and a list of missing elements,
      wherein the specification review report is displayable via a screen in a tabular format and includes at least one column, the at least one column including a first column of a plurality of names that relate to the element of the generated API and a second column of a plurality of review comments that correspond to the element of the generated API, and
      wherein the second column of the plurality of review comments outline the identified error in a human-readable format;
   generating, by the processor, at least one testing scenario based on the specification;
   executing, by the processor, a test for each of the at least one testing scenario; and
   generating, by the processor, based on a result of the executing, an output report that relates to a health of the service, the output report including an indication of at least one successful item that corresponds to an expected result from execution of the service.

2. The method of claim 1, wherein the service is associated with the application programming interface (API).

3. The method of claim 2, wherein the plurality of elements include a base path to be used by the service, a resource definition, a service end point, an API description element, a required parameter for a request of the service, a response type, and a response description element.

4. The method of claim 2, wherein the generating the specification review report comprises:
   determining whether the API conforms with a predetermined set of governance standards; and
   generating the specification review report based on a result of the determining.

5. The method of claim 1, wherein the specification is a YAML Ain't Markup Language (YAML) specification.

6. The method of claim 1, wherein the at least one testing scenario includes at least one executable open-source JavaScript framework testing scenario.

7. The method of claim 1, further comprising:
   receiving, by the processor from a user, a user-generated testing scenario;
   executing, by the processor, an additional test for the user-generated testing scenario; and
   generating, by the processor, an additional output report based on a result of the executing of the additional test.

8. The method of claim 1, wherein the specification conforms with a standard that corresponds to an OpenAPI Specification.

9. The method of claim 1, wherein the output report includes at least one error indication that is associated with the service.

10. The method of claim 1, wherein the output report includes at least one missing item that is associated with the service.

11. A computing device configured to implement an execution of a method for performing a test that relates to a service, the computing device comprising:
   a display screen;
   a processor;
   a memory; and
   a communication interface coupled to each of the processor, the memory, and the display screen,
   wherein, when the method is being executed, the processor is configured to:
      receive, via the communication interface, a specification for the service, the specification including a plurality of elements;
      automatically generate an application programming interface (API) for the service based on the specification,
         wherein the automatically generated API enables access to the service;
      generate a specification review report that relates to whether each element of the generated API is compliant with an applicable standard, the specification review report including a list of error elements that relates to an identified error and a list of missing elements,
         wherein the specification review report is displayable via a screen in a tabular format and includes at least one column, the at least one column including a first column of a plurality of names that relate to the element of the generated API and a second column of a plurality of review comments that correspond to the element of the generated API, and
         wherein the second column of the plurality of review comments outline the identified error in a human-readable format;
      generate at least one testing scenario based on the specification;
      execute a test for each of the at least one testing scenario; and
      generate, based on a result of the executing, an output report that relates to a health of the service, the output report including an indication of at least one successful item that corresponds to an expected result from execution of the service.

12. The computing device of claim 11, wherein the service is associated with the application programming interface (API) that is implemented on the display screen.

13. The computing device of claim 12, wherein the plurality of elements include a base path to be used by the service, a resource definition, a service end point, an API description element, a required parameter for a request of the service, a response type, and a response description element.

14. The computing device of claim 12, wherein the processor is further configured to generate the specification review report by:
  determining whether the API conforms with a predetermined set of governance standards; and
  generating the specification review report based on a result of the determining.

15. The computing device of claim 11, wherein the specification is a YAML Ain't Markup Language (YAML) specification.

16. The computing device of claim 11, wherein the at least one testing scenario includes at least one executable open-source JavaScript framework testing scenario.

17. The computing device of claim 11, wherein the processor is further configured to:
  receive, from a user via the communication interface, a user-generated testing scenario;
  execute an additional test for the user-generated testing scenario; and
  generate an additional output report based on a result of the executing of the additional test.

18. The computing device of claim 11, wherein the specification conforms with a standard that corresponds to an OpenAPI Specification.

19. The computing device of claim 11, wherein the output report includes at least one error indication that is associated with the service.

20. The computing device of claim 11, wherein the output report includes at least one missing item that is associated with the service.

* * * * *